United States Patent [19]
Lulay

[11] Patent Number: 5,676,025
[45] Date of Patent: Oct. 14, 1997

[54] APPARATUS FOR BALANCING A ROTARY MEMBER

[75] Inventor: Eugen Lulay, Bensheim, Germany

[73] Assignee: Gebr. Hofmann GmbH & Co. KG Maschinenfabrik, Pfungstadt, Germany

[21] Appl. No.: 573,966

[22] Filed: Dec. 15, 1995

[30] Foreign Application Priority Data

Dec. 16, 1994 [DE] Germany ............... 44 44 992.5

[51] Int. Cl.⁶ ................... F16F 15/36; G01M 1/36
[52] U.S. Cl. ................... 74/573 R; 73/470; 451/343
[58] Field of Search ............... 74/573 R; 73/470, 73/460, 461; 451/343

[56] References Cited

U.S. PATENT DOCUMENTS

| | | | |
|---|---|---|---|
| 3,698,263 | 10/1972 | Ito | 74/573 R |
| 3,952,612 | 4/1976 | Kurkowski et al. | 74/573 R |
| 4,474,076 | 10/1984 | Lehmann | 74/573 R |
| 5,007,305 | 4/1991 | Linder | 74/573 R |
| 5,125,188 | 6/1992 | Ogawa et al. | 74/573 R X |
| 5,240,358 | 8/1993 | Hackett et al. | 451/343 X |
| 5,277,500 | 1/1994 | Keck | 384/210 |
| 5,450,337 | 9/1995 | Chuan-Yuan et al. | 74/573 R X |

FOREIGN PATENT DOCUMENTS 409050 7/1990 European Pat. Off. .

*Primary Examiner*—Charles A. Marmor
*Assistant Examiner*—Troy Grabow
*Attorney, Agent, or Firm*—Cushman Darby & Cushman IP Group of Pillsbury Madison & Sutro LLP

[57] ABSTRACT

An apparatus for balancing a rotary member such as a grinding wheel has at least one balancing weight which is guided movably for varying its position with respect to the axis of rotation of the rotary member. The balancing position of the balancing weight is adjusted by means of at least one displacement device including an electric motor. The motor is arranged with its axis of rotary oriented radially with respect to the axis of rotation of the rotary member. The rotor of the motor can be supported by way of a thrust bearing against a main body portion.

15 Claims, 2 Drawing Sheets

APPARATUS FOR BALANCING A ROTARY MEMBER

BACKGROUND OF THE INVENTION

1. Field of the Invention

The present invention relates to an apparatus for balancing a rotary member using displaceable balancing weight to correct and compensate for unbalance in the rotary member.

2. Description of the Prior Art

For the purposes of compensating for unbalance of a rotary member, such as a grinding wheel, it is possible to provide at least one balancing weight which is guided for varying its position with respect to the axis of rotation of the rotary member. The balancing weight can be displaced by at least one displacement assembly which includes an electric control member.

In one form of such an arrangement, as is to be found in EP 0 409 050 A2, two balancing weights are arranged around the axis of rotation of the grinding wheel on the same radii at different angular positions, and are appropriately adjustable by the displacement means to provide for compensation in respect of unbalance of the grinding wheel. The displacement means includes two electric control motors which are arranged in coaxial side-by-side relationship, with the shafts of the motors being disposed on the axis of rotation of the grinding wheel. The bending moments and forces in the armature of the electric motors, which occur upon rotation of the grinding wheel, have an adverse effect on the functional capability and operability thereof and therewith also adversely affect the displacement means if the motors are not disposed exactly on the axis of rotation of the grinding wheel.

SUMMARY OF THE INVENTION

An object of the present invention is to provide an apparatus for balancing a rotary member, such as a grinding wheel, whose functional capability and reliability can be further improved.

Another object of the present invention is to provide an apparatus for balancing a rotary member, such as a grinding wheel, which is so designed that forces produced in operation of the rotary member are appropriately carried in a rational manner, thereby enhancing the reliability of operation of the apparatus.

Still a further object of the present invention is to provide a rotary member having an apparatus for balancing same, which can be of a compact design configuration while affording a high level of reliability in terms of balancing accuracy.

In accordance with the principles of the present invention, the foregoing and other objects are attained by an apparatus for balancing a rotary member having an axis of rotation, including at least one balancing weight which is guided movably for varying its position with respect to the axis of rotation of the rotary member. At least one displacement assembly that includes an electric control motor provides the ability to set the appropriate balancing position of the balancing weight. The control motor has its axis of rotation arranged in a radial orientation with respect to the axis of rotation of the rotary member.

As will be seen from a detailed description hereinafter of a preferred embodiment of the apparatus of the present invention, the arrangement of the invention is such that bending forces due to centrifugal acceleration cannot act on the armature or rotor of the electric control motor upon rotation of the rotary member, thereby ensuring reliability of operation of the control motor and therewith the balancing apparatus, even when a grinding wheel which requires balancing is rotating at high speeds of rotation. The rotor in the control motor can be supported on a main body portion of the rotary member by way of an additional thrust bearing, whereby the centrifugal force of the rotor is reliably carried. The control motor then remains fully operational even when the rotary member to be balanced is rotating at high speed and thus involves a high level of centrifugal force.

A preferred feature of the invention the apparatus is a step-down transmission for coupling the control motor to the movable balancing weight. Providing for drive forces for the balancing weight by way of this transmission makes it possible to use small control motors whose rotor mass, and the loading resulting therefrom due to centrifugal force, is lower.

The apparatus according to the invention may use any suitable number of balancing weights, any suitable shape thereof, any suitable arrangement thereof and any suitable path of displacement movement thereof, but preferably the balancing weights are in the shape of a circular arc and they can be in the form of concentric balancing or inertia rings. When they are arranged on an annular main body portion, the region around the axis of rotation of the rotary member remains free so that the main body portion of the apparatus can also be fixed on a shaft of a grinding machine. That is made possible by virtue of the arrangement in accordance with the invention of the control motors which, instead of being arranged on the axis of rotation of the rotary member, can be disposed in an annular region with their motor shafts oriented radially as the motor rotor is not subjected to any bending loading.

The two inertia or balancing rings can be driven by the displacement means with the control motor in such a way that the rings are moved in the same or opposite directions. Preferably, however, the apparatus has first and second displacement means, wherein a respective control motor displaces a respective ring that provides for a symmetrical arrangement of the balancing rings and the displacement means on the main body portion, with an advantageous effect in terms of the centrifugal forces involved.

The balancing rings can be mounted on the main body portion in rolling bearing assemblies so that they are guided in an almost friction-free condition and can be displaced by the application of a low actuating force.

In accordance with a preferred feature of the invention, the rings have a plurality of bores which are provided over a portion of the circular configuration thereof and which reduce the mass of the rings in that portion, thereby to provide for a suitable variation in the mass of the ring overall. In addition, in accordance with a further preferred feature, a material with a high specific weight may be disposed in at least one of the bores for mass variation of the ring by increasing the weight of the portion of the at least one bore having the material of high specific weight therein.

Further objects, features and advantages of the present invention will be apparent from the following description of the preferred embodiment thereof.

DETAILED DESCRIPTION OF THE PREFERRED EMBODIMENT

Figure 1:
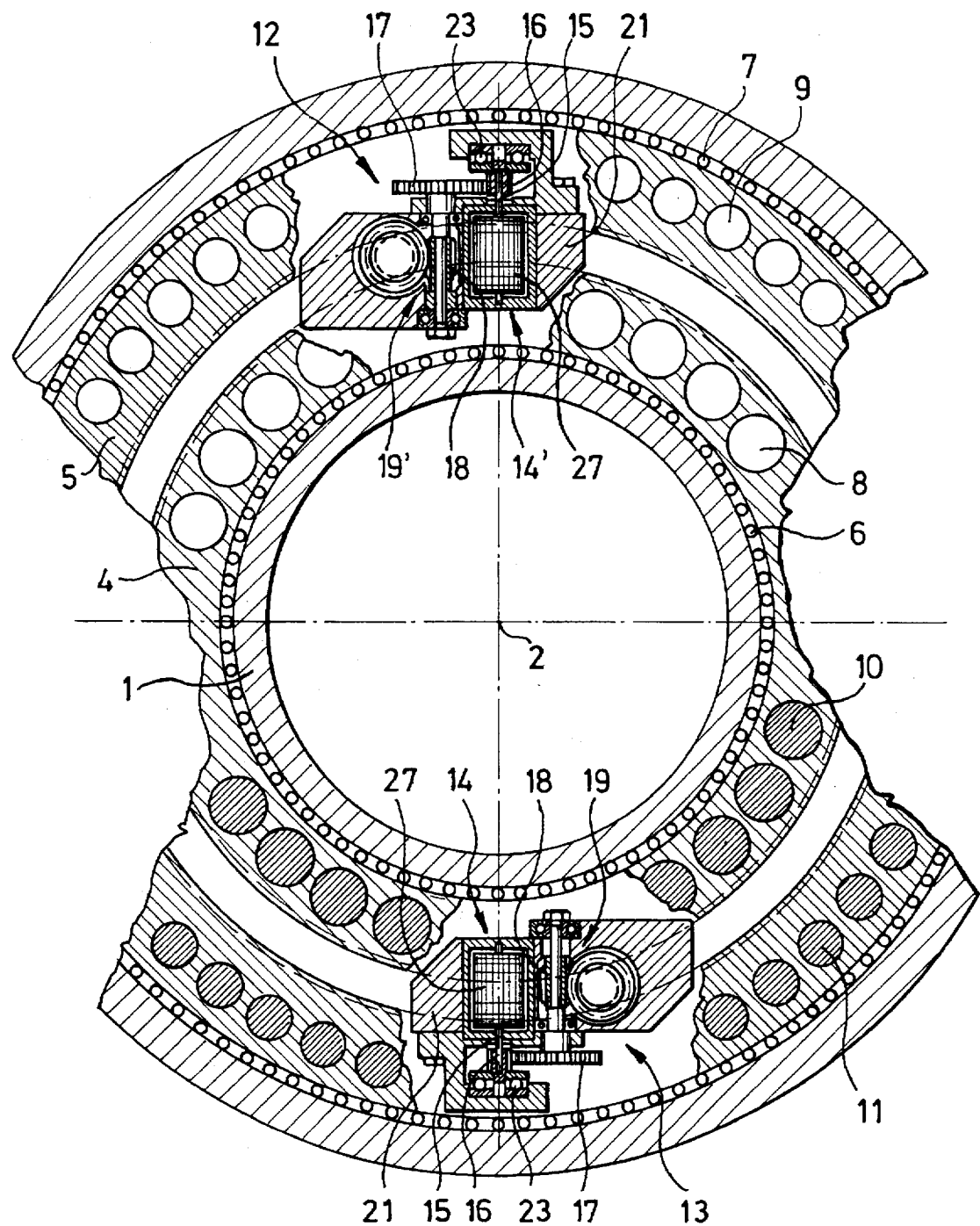
FIG. 1 is a view of the apparatus according to the invention in cross-section taken perpendicularly to the axis of rotation of a rotary member in the form of a grinding wheel.
Figure 2:
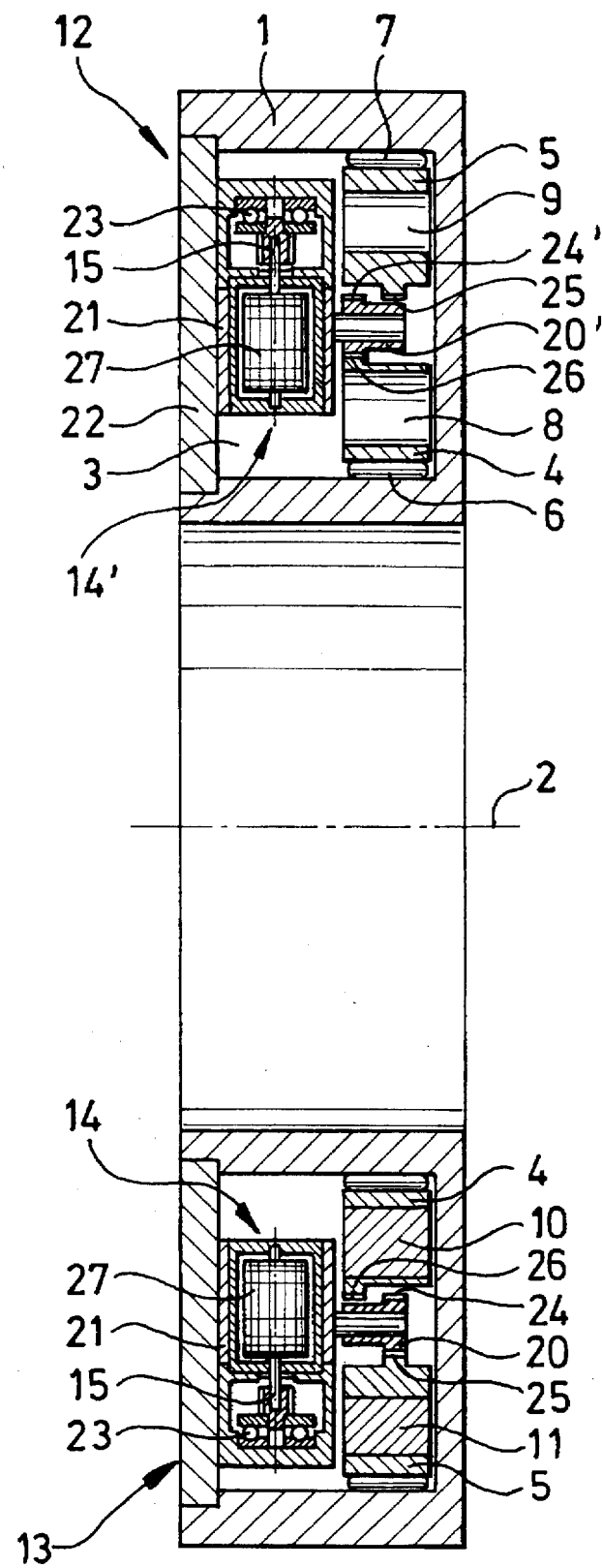
FIG. 2 shows the apparatus of FIG. 1 in a view in cross-section taken parallel to the axis of rotation of the rotary member.

Referring first to FIG. 1, the apparatus for balancing a rotary member such as a grinding wheel, as illustrated therein, includes an annular main body portion 1 which can be fixed to a shaft of a grinding machine for rotation about the axis of rotation 2 of the rotary member. A grinding wheel member (not shown) is fixed for example by screws or the like to the main body portion 1 for rotation about the axis of rotation 2 thereof. The main body portion 1 includes an annular recess 3, as shown in FIG. 2, which accommodates first and second annular balancing weights in the form of an inner inertia or balancing ring 4 and an outer inertia or balancing ring 5. The two balancing rings 4 and 5 are arranged concentrically relative to the axis of rotation 2 and in a plane perpendicular to the axis of rotation 2. Further, rings 4 and 5 are radially supported on the main body portion 1 by an inner rolling bearing assembly 6 and an outer rolling bearing assembly 7, respectively, which are each illustrated by rolling bearings in the Figures. They are axially fixed in position by suitable stops (not shown) and they are mounted rotatably in the peripheral direction with respect to the main body portion 1.

The two balancing rings 4 and 5 have a multiplicity of bores 8 and 9, respectively, which extend parallel to the axis of rotation 2 of the rotary member and which are distributed around the peripheries of the respective rings 4 and 5. In the two balancing rings 4 and 5, inserts 10 and 11 of a material with a high specific weight are arranged in the bores 8 and 9 disposed in a portion of each ring, for example, over an angular region of between 90° and 180°. In that way the balancing rings 4 and 5 have an unequal mass distribution over their respective periphery, with a lighter and a heavier portion. The bores 8 and 9 may also be provided only over a limited angular region of the balancing rings 4 and 5, thereby producing an unequal mass distribution in a similar fashion.

First and second displacement mechanisms 12 and 13 are arranged symmetrically relative to each other in the recess 3 of the main body portion 1, in positions which are in opposite relationship with respect to the axis of rotation 2 of the rotary member. As the two displacement mechanisms 12 and 13 are of almost identical structure, the description thereof is set out hereinafter with reference to the one displacement mechanism 13 which drives and displaces the outer balancing ring 5.

The displacement mechanism 13 includes an electrical control motor 14 whose motor shaft 15, which thus defines the axis of rotation of the motor 14, is oriented radially with respect to the axis of rotation 2 of the rotary member. Also included is a pinion 16 which is fixed on the motor shaft 15, a gear 17 which is driven by the pinion 16, and which is coaxially connected to a driving worm gear 18 of a worm transmission 19, and a driven gear 20 of the worm transmission 19. The worm transmission 19 constitutes a step-down transmission. The components of the displacement mechanism 13 are mounted on a supporting housing 21 which is fixed to an annular plate indicated at 22 in FIG. 2, or to the main body portion 1. Besides a conventional radial shaft bearing arrangement, the motor shaft 15 is also supported in an axial direction on the supporting housing 21 and thus on the main body portion 1 in an axial direction by way of a thrust bearing 23, for example, a ball-type thrust bearing. The armature or rotor 27 of control motor 14 which, upon rotation of the main body portion 1, is exposed to the centrifugal forces which occur and is thus reliably and precisely supported in an axial direction. The control motor 14 is supplied with power, for example, by way of slip rings (not shown) or by way of contact-less power transmission means.

The driven gear 20 of the displacement mechanism 13 has an external tooth configuration, as indicated at 24 in FIG. 2, which is in engagement with an annular tooth configuration 25 at the inside periphery of the outer balancing ring 5 so that the control motor 14 can displace the balancing ring 5 in its peripheral direction by way of the worm transmission 19. The worm transmission 19 is a self-locking transmission so that the balancing ring 5 cannot move upon rotation of the main body portion 1 or the grinding wheel, and it cannot exert a force on the control motor 14.

In the same manner the driven gear 20', in FIG. 2, of the other displacement mechanism 12, has an external tooth configuration 24' which is arranged in axially displaced relationship with respect to the external tooth configuration 24 of the gear 20. The tooth configuration 24' is in engagement with an annular tooth configuration indicated at 26 in FIG. 2 on the outside periphery of the inner balancing ring 4 so that the control motor 14' can displace the balancing ring 4 in the peripheral direction byway of the worm transmission 19', shown in FIG. 1 of the other displacement mechanism 12. The worm transmission 19' is also self-locking.

Measurement of the magnitude of the unbalance to be compensated is effected in a conventional manner, for example, by way of a procedure which involves detecting vibrations of the machine, which are caused by the unbalance of the rotary member, using vibration pick-ups. Such a system is shown in U.S. Pat. No. 5,243,788, which is hereby incorporated by reference.

Balancing of the rotary member is effected by a procedure whereby the first and second displacement mechanisms 12 and 13, in accordance with the ascertained magnitude of unbalance, respectively displace the balancing rings 4 and 5 into the appropriately calculated balancing position during the rotary movement of the rotary member to be balanced.

The apparatus in accordance with the invention can be used generally for compensating for unbalance on rotary members which have to be balanced, in particular while in operation and at a high speed of rotation, such as, for example, machine tool spindles which carry unbalanced workpieces, or rotors of flow machines such as pumps or fans, to which dirt and the like contamination can cling causing unbalance thereof.

It will be appreciated that the above-described apparatus for balancing a rotary member and the rotary member including that apparatus have been set forth solely by way of example and illustration of the principles of the present invention and that various modifications and alterations have been set forth solely by way of example and illustration of the principles of the present invention and that various modifications and alterations may be made therein without thereby departing from the spirit and scope of the invention as set forth in the following claims.

What is claimed is:

1. Apparatus for balancing a rotary member having an axis of rotation, comprising:

an annular main body portion, first and second balancing weights in the form of rings of different diameters coaxially mounted on said annular main body portion;

means for guiding said first and second balancing weights for varying the angular position of each with respect to the axis of rotation of the rotary member; and at least one displacement means including an electric control motor for setting the balancing position of said first and second balancing weights, said electric control motor having an axis of rotation arranged with a radial orientation with respect to said axis of rotation of said rotary member.

2. Apparatus as set forth in claim 1 wherein said control motor has a rotor, and further including a main body portion and a thrust bearing for rotatably supporting said rotor of said control motor on said main body portion.

3. Apparatus as set forth in claim 2 including a support housing on the main body portion, and wherein said rotor of said control motor is supported on said support housing.

4. Apparatus as set forth in claim 1 further including a step-down transmission assembly coupled between said control motor and said balancing weight.

5. Apparatus as set forth in claim 1 wherein said first and second balancing weights are each in the form of a circular arc positioned concentrically with respect to said axis of rotation of said rotary member, said first and second balancing weights having unequal mass distribution thereon.

6. Apparatus as set forth in claim 5 wherein said control motor is coupled to each of said first and second balancing weights to control displacement thereof along said guiding means.

7. Apparatus as set forth in claim 4 wherein said control motor is coupled to each of said first and second balancing weights to control displacement thereof along said guiding means.

8. Apparatus as set forth in claim 4 wherein said transmission comprises a self-locking worm transmission.

9. Apparatus as set forth in claim 1 further including rolling bearings supporting said rings on the main body portion.

10. Apparatus as set forth in claim 1 wherein said rings further include means defining bores extending therein for receiving mass variation members therein.

11. Apparatus as set forth in claim 10 wherein said bores are disposed over at least a portion of each ring.

12. Apparatus as set forth in claim 10 including a weight disposed in at least one of said bores thereby varying the mass of the respective ring.

13. In a rotary member having an axis of rotation, an apparatus for balancing the rotary member, the apparatus comprising:

first and second balancing weights in the form of coaxial rings of different diameters and first and second displacement assemblies operatively connected to respective ones of said first and second balancing weights;

means for guiding said first and second balancing weights for varying the angular position of each with respect to the axis of rotation of the rotary member so that together with said first and second displacement assemblies each of said first and second balancing weights can be moved along said guiding means; and at least one displacement means including an electric control motor for setting the balancing position of said at least one balancing weight, said electric control motor having an axis of rotation which is oriented radially with respect to the axis of rotation of said rotary member.

14. The apparatus as set forth in claim 13 wherein the rotary member comprises a grinding wheel.

15. Apparatus as set forth in claim 13 wherein said rings further include means defining bores extending therein for receiving mass variation members therein.

* * * * *